United States Patent
Ito et al.

(10) Patent No.: US 9,758,685 B2
(45) Date of Patent: Sep. 12, 2017

(54) NONAQUEOUS INK JET INK COMPOSITION

(71) Applicant: Seiko Epson Corporation, Tokyo (JP)

(72) Inventors: Jun Ito, Shimosuwa (JP); Keiji Iida, Chikuhoku (JP); Kenichiro Kubota, Matsumoto (JP); Naoki Koike, Matsumoto (JP); Makoto Nagase, Shiojiri (JP)

(73) Assignee: Seiko Epson Corporation (JP)

( * ) Notice: Subject to any disclaimer, the term of this patent is extended or adjusted under 35 U.S.C. 154(b) by 20 days.

(21) Appl. No.: 14/967,710

(22) Filed: Dec. 14, 2015

(65) Prior Publication Data

US 2016/0168405 A1    Jun. 16, 2016

(30) Foreign Application Priority Data

Dec. 15, 2014 (JP) ................. 2014-252818

(51) Int. Cl.
  *C09D 11/38* (2014.01)
  *C09D 11/36* (2014.01)
  *C09D 11/322* (2014.01)
  *C09D 11/106* (2014.01)

(52) U.S. Cl.
  CPC ............ *C09D 11/36* (2013.01); *C09D 11/106* (2013.01); *C09D 11/322* (2013.01); *C09D 11/38* (2013.01)

(58) Field of Classification Search
  CPC .................................................. C09D 11/36
  See application file for complete search history.

(56) References Cited

U.S. PATENT DOCUMENTS

| 2009/0088500 A1* | 4/2009 | Nishimoto | C09D 11/36 524/88 |
| 2009/0169834 A1 | 7/2009 | Sano et al. | |
| 2010/0265309 A1* | 10/2010 | Kaneko | C09D 11/322 347/105 |
| 2012/0210908 A1 | 8/2012 | Endo et al. | |
| 2013/0120492 A1 | 5/2013 | Kubota et al. | |

FOREIGN PATENT DOCUMENTS

| EP | 2210922 A1 | 7/2010 |
| EP | 2492321 A1 | 8/2012 |
| JP | 2004-070048 A | 3/2004 |
| JP | 2008-081689 A | 4/2008 |
| JP | 2009-173853 A | 8/2009 |
| JP | 2010-270225 A | 12/2010 |
| JP | 2011-089043 A | 5/2011 |
| JP | 2012-046671 A | 3/2012 |

OTHER PUBLICATIONS

Extended European Search Report for Application No. EP 15 19 9817 dated Apr. 18, 2016 (7 pages).

* cited by examiner

*Primary Examiner* — Veronica F Faison
(74) *Attorney, Agent, or Firm* — Harness, Dickey & Pierce, P.L.C.

(57) ABSTRACT

A nonaqueous ink jet ink composition according to the invention includes a solvent including at least one compound represented by the following formula (1), and a pigment including a pigment orange 43 (PO-43), in which a Na amount included in the ink is 5 ppm to 500 ppm.

$$R^1O—(R^2O)_m—R^3 \quad (1)$$

(wherein, in formula (1), $R^1$ and $R^3$ each independently represent hydrogen or an alkyl group having 1 to 5 carbon atoms. However, either $R^1$ or $R^3$ is an alkyl group having 1 to 5 carbon atoms. $R^2$ represents an alkylene group having 2 or 3 carbon atoms. m represents an integer of 1 to 6.)

9 Claims, No Drawings

NONAQUEOUS INK JET INK COMPOSITION

BACKGROUND

1. Technical Field

The present invention relates to a nonaqueous ink jet ink composition.

2. Related Art

An ink jet recording apparatus which records an image or a letter by causing a recording head to discharge a minute ink droplet from nozzle holes so as to adhere on a recording medium is known. In addition, as an ink used for the recording, an ink jet ink composition including various components, for example, a coloring material, a surfactant, water, an organic solvent, and the like, is known. In addition, in an ink jet ink composition, a nonaqueous ink jet ink composition substantially not including water has been developed.

Such a nonaqueous ink composition has excellent adaptability to a vinyl chloride-based recording medium, and is usually used for recording a so-called sign, for example, an outdoor signboard. However, in a case where the nonaqueous ink jet ink composition is used for recording a sign, weather resistance of a recorded matter may be insufficient. Specifically, the recorded matter for a sign is usually used in an outdoor environment exposed to rain, sunlight, or the like, and thus higher weather resistance is required than the recorded matter used for an indoor environment.

Meanwhile, when the composition includes an orange ink (special ink) in addition to respective color inks of cyan, magenta, yellow, and black, it is possible to realize a color development having a wide gamut. However, it is understood that the weather resistance of the orange ink pigment is deteriorated compared to other inks. Therefore, from a viewpoint of improving weather resistance of the orange ink, an aqueous ink composition, a nonaqueous ink composition, or an ink set including a pigment orange 43 (PO43) having relatively excellent weather resistance as an orange ink pigment is suggested (for example, refer to JP-A-2009-173853, JP-A-2004-70048, and JP-A-2011-89043).

However, when the nonaqueous ink composition including PO43 is stored for a long period of time, it is apparent that foreign matter is generated in an ink. When the foreign matter is generated in the ink, problems may occur such as clogging of nozzles for discharging an ink of the ink jet printer, the occurrence of nozzle slip-out, and the like.

SUMMARY

Therefore, an advantage of some aspects of the invention is to provide a nonaqueous ink jet ink composition which can form an image having excellent weather resistance and printing quality and has excellent storage stability for a long period of time by suppressing generation of foreign matter in an ink.

The invention can be realized in the following aspects or application examples.

Application Example 1

According to this application example, there is provided a nonaqueous ink jet ink composition including a solvent including at least one compound represented by the following formula (1), and a pigment including a pigment orange 43 (PO-43), in which a Na amount included in the ink is 5 ppm to 500 ppm.

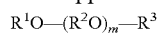  (1)

(in which, in formula (1), $R^1$ and $R^3$ each independently represent hydrogen or an alkyl group having 1 to 5 carbon atoms. Here, either of $R^1$ or $R^3$ is an alkyl group having 1 to 5 carbon atoms. $R^2$ represents an alkylene group having 2 or 3 carbon atoms. m represents an integer of 1 to 6.)

In this case, an image having excellent weather resistance and printing quality can be formed, generation of foreign matter in the ink is suppressed, and storage stability is excellent for a long period of time.

Application Example 2

In the nonaqueous ink jet ink composition according to Application Example 1, a Ca amount included in the ink may be 5 ppm to 200 ppm.

Application Example 3

In the nonaqueous ink jet ink composition according to Application Example 1 or 2, content of the PO-43 may be 1 mass % to 10 mass % with respect to a total amount of the ink composition.

Application Example 4

In the nonaqueous ink jet ink composition according to any one of Application Examples 1 to 3, a total content of the compound represented by the formula (1) may be 10 mass % to 90 mass % with respect to a total amount of the ink composition.

Application Example 5

In the nonaqueous ink jet ink composition according to any one of Application Examples 1 to 4, cyclic ester may be further included as the solvent.

Application Example 6

The nonaqueous ink jet ink composition according to any one of Application Examples 1 to 5 may further include a vinyl chloride resin.

Application Example 7

In the nonaqueous ink jet ink composition according to any one of Application Examples 1 to 6, the Na amount may be 50 ppm to 500 ppm.

Application Example 8

In the nonaqueous ink jet ink composition according to any one of Application Examples 1 to 7, Na may be included as an electrolyte.

Application Example 9

In the nonaqueous ink jet ink composition according to any one of Application Examples 1 to 8, content of ionic chlorine may be 50 ppm to 800 ppm with respect to a total amount of the ink composition.

DESCRIPTION OF EXEMPLARY EMBODIMENTS

Hereinafter, a preferable embodiment of the invention is described. The embodiment described below describes one example of the invention. The invention is not limited to the following embodiment, and includes various modification examples executed in the range not departing from the gist of the invention. In addition, entire configurations described below are not always the essential configurations of the invention.

1. Nonaqueous Ink Jet Ink Composition

The nonaqueous ink jet ink composition according to the embodiment includes a solvent and a pigment, and a Na amount included in the ink is 5 ppm to 500 ppm. The nonaqueous ink jet ink composition according to the embodiment uses a volatile solvent (mainly, an organic solvent) as a main component, and is an ink used for recording in which the ink is adhered on a recording medium and then the solvent is dried by heat or at room temperature so as to fix a solid content. Therefore, this ink is different from a photocurable ink which is cured by being irradiated with radiation (light).

The "nonaqueous" ink jet ink composition of the invention means that when the ink composition is manufactured, water is not intentionally added, but a trace amount of moisture which is inevitably mixed in during manufacturing or storing the ink composition may be included.

Hereinafter, each component included in the nonaqueous ink jet ink composition according to the embodiment is described.

1.1. Solvent

A solvent included in the nonaqueous ink jet ink composition according to the embodiment includes at least one compound represented by the following formula (1).

1.1.1. Compound Represented by Formula (1)

$$R^1O-(R^2O)_m-R^3 \qquad (1)$$

(In formula (1), $R^1$ and $R^3$ each independently represent hydrogen or an alkyl group having 1 to 5 carbon atoms. Here, either $R^1$ or $R^3$ is an alkyl group having 1 to 5 carbon atoms. $R^2$ represents an alkylene group having 2 or 3 carbon atoms. m represents an integer of 1 to 6.)

Here, the alkyl group having 1 to 5 carbon atoms may be a linear or branched alkyl group and specifically, the examples thereof include a methyl group, an ethyl group, an n-propyl group, an iso-propyl group, an n-butyl group, a sec-butyl group, a tert-butyl group, an n-pentyl group, iso-pentyl, and a tert-penthyl group. In addition, the examples of the alkylene group of 2 to 3 carbon atoms include an ethylene group (dimethylene) and a propylene group (trimethylene or methylethylene). In addition, the compound represented by formula (1) described above is alkylene glycol alkyl ether. The compound represented by formula (1) described above may be included singly or two or more thereof may be included.

The specific examples of the compound represented by formula (1) described above include diethylene glycol methyl ethyl ether (176° C.)(may be abbreviated to "DEGMEE" or "MEDG"), diethylene glycol dimethyl ether (162° C.)(may be abbreviated to "DEGdME"), dipropylene glycol dimethyl ether (175° C.), diethylene glycol diethyl ether (189° C.)(may be abbreviated to "DEGdEE" or "DEDG"), diethylene glycol monomethyl ether (194° C.) (may be abbreviated to "DEGmME"), diethylene glycol monoisopropyl ether (207° C.), diethylene glycol mono-hexyl ether (259° C.), diethylene glycol butyl methyl ether (212° C.)(may be abbreviated to "DEGBME"), diethylene glycol dibutyl ether (256° C.)(may be abbreviated to "DEGdBE"), dipropylene glycol monopropyl ether (210° C.), dipropylene glycol monobutyl ether (222° C.), triethylene glycol monomethyl ether (249° C.), triethylene glycol monobutyl ether (276° C.), triethylene glycol dimethyl ether (216° C.)(may be abbreviated to "TriEGdME" or "DMTG"), tripropylene glycol monomethyl ether (242° C.), tripropylene glycol monobutyl ether (274° C.), tripropylene glycol dimethyl ether (215° C.), tetraethylene glycol monobutyl ether (290° C.)(may be abbreviated to "TetraEGmBE" or "BTG-H"), tetraethylene glycol dimethyl ether (275° C.) (may be abbreviated to "TetraEGdME"), or the like. In addition, the numerical number within the parenthesis in the above examples indicates a boiling point.

From a viewpoint of increasing a drying property and printing quality of the nonaqueous ink jet ink composition, it is preferable to use the compound having a boiling point of 170° C. or higher among the above compounds. It is possible to control a drying property of the nonaqueous ink jet ink composition and to suppress wet extendability or coagulation irregularity (coagulation of a pigment, or the like) in an image to be formed, by combining the compounds having a boiling point of 170° C. or higher.

A content of the compound represented by formula (1) described above (in a case of using a plurality of types, the content thereof) with respect to a total amount of the nonaqueous ink jet ink composition is preferably 10 mass % to 90 mass %, more preferably 20 mass % to 80 mass %, still more preferably 30 mass % to 75 mass %, and particularly preferably 40 mass % to 70 mass %.

In addition, in the compound represented by formula (1) described above, a content of the compound having a flash point of 140° C. or lower (in a case of using a plurality of types, the content thereof) with respect to a total amount of the nonaqueous ink jet ink composition is preferably 10 mass % to 90 mass %, more preferably 20 mass % to 80 mass %, and particularly preferably 40 mass % to 70 mass %.

1.1.2. Cyclic Ester

The nonaqueous ink jet ink composition according to the embodiment may include cyclic ester (cyclic lactone) as the solvent. Since the nonaqueous ink jet ink composition includes cyclic ester, it is possible for the nonaqueous ink jet ink composition to permeate inside of a recording medium by being dissolved in a part of a recording surface (for example, a recording surface including a vinyl chloride-based resin) of the recording medium. Since the ink is permeated into the inside of the recording medium, it is possible to improve friction resistance (rubbing fastness) of the recorded image on the recording medium. In other words, since cyclic ester has high affinity to the vinyl chloride-based resin, a component of the nonaqueous ink jet ink composition easily infiltrates into the recording surface (easily soaked in). Owing to the effect of the cyclic ester, it is considered that the nonaqueous ink jet ink composition with the cyclic ester mixed therein can form an image having excellent friction resistance even in difficult conditions such as an outside environment.

In one molecule having a hydroxyl group and a carboxyl group, the cyclic ester is a compound having a structure in which the hydroxyl group and the carboxyl group are dehydrated and condensed in the molecule. The cyclic ester has a heterocycle including two or more carbon atoms and one oxygen atom, and has a structure in which a carbonyl group is disposed adjacent to the oxygen atom forming the heterocycle, and is a compound generally referred to as lactone.

As the cyclic ester, the examples thereof having a simple structure include β-propiolactone, β-butyrolactone, γ-butyrolactone, γ-valerolactone, γ-caprolactone, σ-valerolactone, ε-caprolactone, or the like. In addition, the number of ring members of the cyclic ester heterocycle is not particularly limited, and further, for example, an arbitrary side chain may be bonded to the ring member of the heterocycle. The cyclic ester may be used singly or two or more thereof used in combination.

From the viewpoint of further increasing the friction resistance of the image formed by the nonaqueous ink jet ink composition according to the embodiment, among the exemplified cyclic esters, cyclic ester having a 3 membered ring to a 7 membered ring is preferable, cyclic ester having a 5 membered ring or a 6 membered ring is more preferable, and in any case, the cyclic ester having no side chain is more preferable. The specific examples of the cyclic ester include β-butyrolactone, γ-butyrolactone, and γ-valerolactone. In addition, since the cyclic ester has particularly high affinity to polyvinyl chloride, when the cyclic ester is adhered to a recording medium containing polyvinyl chloride, it is possible to obtain an extremely remarkable effect of the increase in friction resistance.

In a case of mixing the cyclic ester, a content (in a case of using a plurality of types, the content thereof) thereof with respect to a total amount of the nonaqueous ink jet ink composition is 5 mass % to 50 mass %, preferably 5 mass % to 40 mass %, and more preferably 10 mass % to 30 mass %.

1.1.3. Other Solvents

The nonaqueous ink jet ink composition according to the embodiment can use the following compounds as the solvent, in addition to the compound represented by formula (1) described above or the cyclic ester.

The examples of the solvent include, for example, alcohols (methyl alcohol, ethyl alcohol, propyl alcohol, butyl alcohol, isopropyl alcohol, fluoroalcohol, or the like), ketones (acetone, methylethylketone, cyclohexanone, or the like), carboxylates (methyl acetate, ethyl acetate, propyl acetate, butyl acetate, methyl propionate, ethyl propionate, or the like), ethers (diethyl ether, dipropyl ether, tetrahydrofuran, dioxane, or the like), polyalcohols (ethylene glycol, diethylene glycol, triethylene glycol, polyethylene glycol, polypropylene glycol, propylene glycol, butylene glycol, 1,2,6-hexanetriol, thio glycol, hexylene glycol, glycerin, trimethylolethane, trimethylolpropane, or the like), or the like.

In addition, (poly)alcohols may be included as the solvent. The examples of the (poly)alcohols include glycerin, propylene glycol, dipropylene glycol, 1,2-butanediol, 1,2-heptanediol, 1,2-hexanediol, 1,2-heptanediol, 3-methyl-1,3-butanediol, 2-ethyl-2-methyl-1,3-propanediol, 2-methyl-1,3-propanediol, 2-methyl-2-propyl-1,3-propanediol, 2,2-dimethyl-1,3-propanediol, 2-methylpentane-2,4-diol, or the like.

In a case where the nonaqueous ink jet ink composition includes (poly)alcohols, a content thereof with respect to a total mass of the nonaqueous ink jet ink composition is preferably 0.05 mass % to 30 mass %, and further preferably 0.1 mass % to 30 mass %, from a viewpoint of improving wet extendability and permeability on the recording medium to reduce gradation irregularity, and securing storage stability and discharge reliability. When the content of (poly) alcohols is within the above range, wettability, permeability, and a drying property of the ink become excellent, and an image having the excellent printing concentration (color development) can be obtained. In addition, when the content of (poly)alcohols is within the above range, it is possible to set viscosity of the ink appropriately and reduce the occurrence of nozzle clogging.

In addition, amines may be mixed in the nonaqueous ink jet ink composition, and the examples thereof include triethanolamine, tripropanolamine, tributanolamine, hydroxylamine such as N,N-dimethyl-2-aminoethanol, and N,N-diethyl-2-aminoethanol, or the like. The amines may be used singly or a plurality thereof may be used. In a case where the composition includes amines, a content thereof with respect to a total mass of the nonaqueous ink jet ink composition is preferably 0.05 mass % to 5 mass %, and further preferably 0.1 mass % to 3 mass %.

In addition, the examples of the solvent include higher fatty acid ester such as methyl laurate, isopropyl hexadecanoate (isopropyl palmitate), isopropyl myristate, methyl oleate, and ethyl oleate, dibasic acid diester in which a dicarbocylic acid of C2 to C8 aliphatic hydrocarbon (the carbon number is the number excluding carbon of a carboxyl group) is diesterified with a C1 to C5 alkyl group, and, alkylamide (N,N-dimethyl decane amide, or the like) in which a monocarboxylic acid of C6 to C10 aliphatic hydrocarbon (the carbon number is the number excluding carbon of a carboxyl group) is admidated (the substituents substituting amide nitrogen atoms each independently represent a hydrogen atom and a C1 to C4 alkyl group), or the like.

One or a plurality of the exemplified other solvents may be added to the nonaqueous ink jet ink composition in an appropriate amount.

1.2. Pigment

The nonaqueous ink jet ink composition according to the embodiment includes the C.I. pigment orange-43 (PO-43) as the pigment.

The PO-43 is a pigment of CAS registry number 4424-06-0, the chemical name is bisbenzimidazo[2,1-b:2',1'-i]benzo[lmn][3,8]phenanthroline-8,17-dione, or, 1,8-(1H-benzimidazole-2,1-diylcarbonyl)-5,4-(1H-benzimidazole-2,1-diylcarbonyl)naphthalene. The PO-43 has a perinone structure, and "perinone orange" is given as a general name. A hue of the PO-43 is a vivid reddish orange. In addition, "C.I." is an abbreviation of color index.

A commercial product of PO-43 may be used, for example, "Hostaperm Orange" and "PV Gast Orange GRL" of Clariant (Japan) K.K., "Fasogen Super Orange 6200" manufactured by DIC Corporation, "Lionogen Orange GR-F" manufactured by TOYO INK CO., LTD., or the like are available.

In a case where the PO-43 is added to the ink, it is desirable to prepare a pigment dispersion and then add the pigment dispersion to the ink. A manufacturing method of the pigment dispersion is not particularly limited, and for example, a method for injecting the PO-43, a medium, and other arbitrary components and dispersing with a high speed disper can be exemplified. Further, if necessary, a bead mill or a roll mill may be used for dispersion. In addition, in order to remove particles of a predetermined size or more which may be included in the finally obtained pigment dispersion, the pigment dispersion is filtrated by a filter or centrifuged. In addition, in a case of performing filtration by a filter, as necessary, a pore diameter (a mesh size) of the filter may be appropriately selected so that the particle diameter of the particles included in the pigment dispersion have a predetermined particle diameter. Most of all, the filtration by a filter is preferably performed in a preparation stage of the pigment dispersion. However, it may be performed in a preparation stage of the ink, or may be performed in each of the preparation stages of the pigment dispersion and the ink.

A volume average particle diameter of the PO-43 included in the nonaqueous ink jet ink composition according to the embodiment is preferably 100 nm to 400 nm, and more preferably 150 nm to 300 nm. Here, the volume average particle diameter of the pigment can be evaluated by the laser diffraction and scattering method. Specifically, an ink-like sample (pigment) is diluted in DEGdEE (diethylene glycol diethyl ether) to be 1000 ppm or less, and it can be measured by reading out the value of median diameter D50 in an environment of 20° C. using the laser diffraction and scattering measurement apparatus (for example, microtrac UPA250 (manufactured by NIKKISO CO., LTD.)). Therefore, even in a case where the PO-43 having a different volume average particle diameter is mixed and used, it is possible to measure a volume average particle diameter of each PO-43 and a volume average particle diameter of the mixture.

In a case where the PO-43 having a different volume average particle diameter is mixed and used, a preferable volume average particle diameter of each PO-43 is 100 nm to 400 nm, the lower limit is more preferably 150 nm or more, and the upper limit is more preferably 350 nm or less, and still more preferably 300 nm or less.

Since the nonaqueous ink jet ink composition according to the embodiment includes C.I. pigment orange-43 (PO-43) having a volume average particle diameter of 100 nm to 400 nm as the pigment, it is possible to improve a balance of the overall performance including weather resistance, printing stability, and friction resistance.

If a commercially available product of PO-43 has a volume average particle diameter in the above range, the product may be used as it is. However, the volume average particle diameter may be adjusted as follows. Specifically, after the solvent (a part or all) is mixed in the pigment, the mixture (a pigment dispersing solvent) is appropriately treated by a ball mill, a bead mill, an ultrasonic crushing and/or a jet mill. Thus, it is possible to adjust distribution of the particle diameter or the volume average particle diameter.

In addition, as the method of adjusting the volume average particle diameter of PO-43, a method may be adopted in which a pigment having a small primary particle diameter is prepared, and when the pigment is mixed with the solvent (a part or all), dispersion is performed by changing an addition amount of a dispersant (described below). Specifically, if the dispersant is added sufficiently, coagulation of the primary particles is avoided, the pigment can be dispersed to have a particle diameter almost the same as that of the primary particles, and it is possible to set the volume average particle diameter based on the small primary particle diameter. In contrast, if the addition amount of the dispersant is small, the primary particles are coagulated and it is possible to set the volume average particle diameter based on the secondary particles. In addition, in this case, the use of a pigment having a smaller primary particle diameter as a starting pigment is more preferable, since the volume average particle diameter can be adjusted more freely. Further, when the free adjustment of the volume average particle diameter is more desired, the adjustment of the average particle diameter may be performed using the dispersant, after an available pigment is crushed first by a ball mill, or the like to have a smaller diameter.

A content of PO-43 with respect to a total amount of the nonaqueous ink jet ink composition according to the embodiment is preferably 1 mass % to 10 mass %, more preferably 1 mass % to 8 mass %, still more preferably 1 mass % to 6 mass %, and particularly preferably 1 mass % to 5 mass %. When the content of PO-43 is within the above range, a particular orange ink having excellent color development can be obtained. In addition, the image formed using this ink has excellent weather resistance.

Meanwhile, the nonaqueous ink jet ink composition according to the embodiment may further include a coloring material other than PO-43 mentioned above. The examples of the coloring material include a pigment and a dye having a hue similar to PO-43, for example, a pigment with a number of C.I. pigment orange as a color index number, a pigment with a number of C.I. pigment red, or the like.

1.3. Sodium (Na), Calcium (Ca), and Ionic Chlorine (Cl)

An amount of Na included in the nonaqueous ink jet ink composition according to the embodiment is 5 ppm to 500 ppm, preferably 50 ppm to 500 ppm, and more preferably 50 ppm to 400 ppm. Further, the upper limit is more preferably 300 ppm or less, and particularly preferably 200 ppm or less. It is assumed that Na included in the nonaqueous ink jet ink composition is derived from impurities included during manufacturing PO-43. An electrolyte derived from the impurities is eliminated from the pigment due to the elapse of time or the temperature. In addition, it is considered that the eliminated Na bonds to $Cl^-$, or the like, and it is precipitated as a crystal, thereby generating foreign matter.

When the Na amount is within the above range, since the Na amount included in the nonaqueous ink jet ink composition is sufficiently small, it is possible to suppress generation of foreign matter in a case of storing the ink for a long period of time. When the Na amount exceeds 500 ppm, $Na^+$ bonds to $Cl^-$, or the like during the storage for a long period of time and foreign matter is easily generated. Meanwhile, when the Na amount is less than 5 ppm, it is necessary to perform a refinement process, for example, cleaning of PO-43 excessively, which leads to an increase in cost and is not preferable.

A Ca amount included in the nonaqueous ink jet ink composition according to the embodiment is preferably 5 ppm to 200 ppm. The upper limit is more preferably 150 ppm or less, and is further preferably 100 ppm or less, and the lower limit is more preferably 10 ppm or more. Ca does not influence the occurrence of the foreign matter as much as Na does; however, it is considered that Ca bonds to $Cl^-$, or the like, and it tends to be precipitated as a crystal. Therefore, when a Ca amount is within the above range, it is possible to more effectively suppress generation of the foreign matter even in a case of storing the ink for a long period of time.

The "Na amount" of the invention refers to a total amount including both the Na atom and $Na^+$. In addition, the "Ca amount" of the invention refers to a total amount including both the Ca atom and $Ca^{2+}$. In addition, it is understood from the study of the inventors that metals other than Na and Ca have little influence on generation of the foreign matter in storage for a long period of time.

The content of Na and Ca included in the nonaqueous ink jet ink composition can be measured using ICP emission analyzing apparatus (ICPES). As the ICP emission analyzing apparatus, for example, the model "ICPS-8000" manufactured by Shimadzu Corporation may be used, and if necessary, pre-treatment such as removal of the organic solvent, decomposition of the organic compound, and the like is performed before the measurement.

As described above, in the nonaqueous ink jet ink composition according to the embodiment, it is assumed that since $Na^+$ or $Ca^{2+}$ included in the ink as an electrolyte bonds to $Cl^-$, it is precipitated as a crystal. Therefore, a content of the ionic chlorine included in the nonaqueous ink jet ink composition according to the embodiment is preferably 50 ppm to 800 ppm. The upper limit is further preferably 600 ppm or less. The ionic chlorine is chlorine included in the ink composition as an electrolyte such as a chlorine ion, a chloride salt, or the like. A content of the ionic chlorine included in the ink composition may be measured by performing a combustion experiment of the ink composition if chlorines included in the ink composition are all ionic chlorines, for example, in a case where the ionic chlorines come from a pigment dispersion liquid, the content of chlorines may be measured by performing a combustion experiment of the pigment dispersion liquid, and then the content of the ionic chlorine with respect to the ink composition may be obtained.

The content of ionic chlorine included in the nonaqueous ink jet ink composition may be measured by using an ion chromatography system. As the ion chromatography system, for example, the model "PS3500DD" manufactured by Shimadzu Corporation may be used, and if necessary, pretreatment such as dilution, removal of a solid phase extraction, a liquid-liquid extraction, and the like may be performed before the measurement.

In order to set the content of Na, Ca, or chlorine included in the nonaqueous ink jet ink composition within the above range, for example, in addition to the method for selecting PO-43 which is a raw material and contains a small amount of the metal salts as impurities, it is possible to adjust the content by adjusting the degree of refinement in the refinement process of the synthesized PO-43.

The degree of the refinement in the refinement process can be adjusted, for example, as follows. The impurities are moved to the solvent by bringing the solvent within a predetermined temperature range into contact with the pigment, which is a crude raw material, and after the impurities are removed from the pigment, which is a crude raw material, a mixture of the solvent and the pigment is cooled as necessary. After that, the mixture is filtered by a general filter such as a filter press, a multifunctional filter device, Nutsche, or the like, and it is divided into the pigment from which the impurities are removed and the solvent including the impurities eluted from the crude raw material. The cooling temperature of the mixture described above is preferably 30° C. or lower, and more preferably 20° C. or lower. In addition, if necessary, the pigment, which is a residue, is washed using a new solvent in a predetermined amount. As the type of the solvent to be used at this time, a type of the solvent which is the same as the solvent used for removing the impurities is preferable. In addition, the use amount of the solvent is not particularly limited, and may be about the amount in which the solvent dissolving the impurities remaining in the residue can be substituted with the new solvent.

After that, the pigment may be further washed using water such as pure water, deionized water, or the like. In addition, instead of the water, alternatively, the pigment may be washed using the solvent, after it is washed with water. In this case, the solvent may be the solvent used for removing the impurities, or may be the solvent used when preparing the pigment dispersion.

As described above, it is possible to obtain a pigment dispersion which includes a medium and the pigment washed with water or the solvent, or washed with water and then washed with the solvent. This pigment dispersion includes the refined PO-43, water and/or the solvent. In addition, a property of the pigment dispersion is not particularly limited, and may be appropriately selected as a liquid, a paste, or the like. In addition, a content ratio of the pigment (solid content) in the pigment dispersion is not particularly limited, and for example, may be 20 mass % to 60 mass %. Further, if necessary, a preservative, a fungicide, a pH adjuster, a rust preventing agent, a moisturizing agent, or the like may be added.

1.4. Other Components

The nonaqueous ink jet ink composition according to the embodiment may further include the components described below, such as a vinyl chloride-based resin, an acrylic resin, a surfactant, a dispersant, or the like.

1.4.1. Vinyl Chloride-Based Resin

The examples of the vinyl chloride-based resin which may be used for the nonaqueous ink jet ink composition according to the embodiment include a copolymer (hereinafter, referred to as "chlo-ace-vi copolymer") including a structural unit derived from vinyl chloride and vinyl acetate. The chlo-ace-vi copolymer can be dissolved in a solvent represented by the formula (1). As a result, due to the chlo-ace-vi copolymer dissolved in the solvent represented by the formula (1), the ink can be strongly fixed on the surface of the recording medium including the vinyl chloride-based resin.

The chlo-ace-vi copolymer can be obtained by a common method, for example, by suspension polymerization. Specifically, after water, the dispersant, and a polymerization initiator are prepared in a polymerization instrument and degassed, vinyl chloride and vinyl acetate are input under pressure to perform suspension polymerization, or a part of vinyl chloride and vinyl acetate are input under pressure to start a reaction, and suspension polymerization is performed while inputting the remaining vinyl chloride during the reaction.

The chlo-ace-vi copolymer preferably contains 70 mass % to 90 mass % of a vinyl chloride unit as a structure thereof. When the vinyl chloride is within the above range, since it stably dissolves in the ink jet ink composition, storage stability for a long period of time is excellent. Further, discharge stability is excellent, and excellent fixability with respect to the recording medium can be obtained.

In addition, the chlo-ace-vi copolymer may include other component units, if necessary, in addition to a vinyl chloride unit and a vinyl acetate unit, for example, a carboxylic acid unit, a vinyl alcohol unit, and a hydroxyalkyl acrylate unit can be exemplified. In particular, the vinyl alcohol unit is preferably exemplified. The copolymer can be obtained by using a monomer corresponding to each unit described above. Specific examples of the monomer imparting a carboxylic acid unit include, for example, a maleic acid, an itaconic acid, maleic anhydride, itaconic anhydride, an acrylic acid, and a methacrylic acid. Specific examples of the monomer imparting a hydroxyalkyl acrylate unit include, for example, hydroxyethyl (meth)acrylate, hydroxyethyl vinyl ether, or the like. A content of the monomer is not limited unless it damages the effect of the invention, for example, the monomer can be copolymerized within a range of 15 mass % or less of the total amount of the monomer.

In addition, a commercially available chlo-ace-vi copolymer may be used, for example, SOLBIN CN, SOLBIN CNL, SOLBIN C5R, SOLBIN TA5R, SOLBIN CL (all of the above are manufactured by Nissin Chemical Co., Ltd.), or the like can be exemplified.

An average degree of polymerization of the vinyl chloride-based resin is not particularly limited, is preferably 150 to 1100, and more preferably 200 to 750. When the average degree of polymerization of the vinyl chloride-based resin is within the above range, since it stably dissolves in the nonaqueous ink jet ink composition according to the embodiment, storage stability for a long period of time is excellent. Further, discharge stability is excellent, and excellent fixability can be obtained with respect to the recording medium. In addition, the average degree of polymerization of the vinyl chloride-based resin is obtained by measuring specific viscosity and calculating it, and can be obtained based on the average degree of polymerization calculation method described in "JISK 6720-2".

In addition, the number average molecular weight of the vinyl chloride-based resin is not particularly limited, preferably 10,000 to 50,000, and more preferably 12,000 to 42,000. In addition, the number average molecular weight can be measured by GPC, and can be obtained as a relative value in terms of polystyrene.

A content of the vinyl chloride-based resin in the nonaqueous ink jet ink composition according to the embodiment may be set to, for example, 0.05 mass % to 6 mass %, and preferably 0.5 mass % to 4 mass %. When the content of the vinyl chloride-based resin is within the above range, due to the vinyl chloride-based resin dissolved in the solvent represented by the formula (1), excellent fixability can be obtained with respect to a vinyl chloride-based recording medium. As the vinyl chloride-based resin, the resin including at least a structural unit derived from vinyl chloride may be used in addition to the chlo-ace-vi copolymer.

The nonaqueous ink jet ink composition according to the embodiment preferably includes the vinyl chloride-based resin and the solvent represented by the formula (1) in a quantity ratio of 1:5 to 1:40 in terms of mass. When the quantity ratio is within the above range, since the vinyl chloride-based resin can be easily dissolved in the solvent represented by the formula (1), it is possible to improve ink fixability on the surface of a recording medium containing the vinyl chloride-based resin, and nozzle clogging hardly occurs.

1.4.2. Acrylic Resin

The nonaqueous ink jet ink composition according to the embodiment may be added with an acrylic resin in addition to the vinyl-based resin, from a viewpoint of improving adhesion of the ink coated film to an image.

The examples of the acrylic resin include poly(meth) acrylic acid, poly(meth)acrylic acid methyl, poly(meth) acrylic acid ethyl, (meth)acrylic acid-(meth)acrylate copolymer resin, styrene-(meth)acryl copolymer resin, ethylene-(meth)acrylate copolymer resin, ethylene alkyl(meth) acrylate resin, ethylene-(meth)acrylate copolymer resin, or the like.

As the acrylic resin, a commercially available product may be used, for example, ACRYPET MF (trade name, manufactured by Mitsubishi Rayon Co., Ltd., an acryl resin), SUMIPEX LG (trade name, manufactured by Sumitomo Chemical Co., Ltd., an acryl resin), PARALOID B series (trade name, manufactured by The DOW Chemical Company, an acryl resin), PARAPET G-1000P (trade name, manufactured by KURARAY CO., LTD., an acryl resin), or the like. In addition, in the invention, the (meth)acrylic acid means both an acrylic acid and a methacrylic acid, and the (meth)acrylate means both acrylate and methacrylate.

A content of the acrylic resin in the nonaqueous ink jet ink composition according to the embodiment may be set to, for example, 0.5 mass % to 10 mass %, and preferably 0.5 mass % to 6 mass %. When the content of the acrylic resin is within the above range, excellent fixability can be obtained with respect to the vinyl chloride-based recording medium.

1.4.3. Surfactant

The nonaqueous ink jet ink composition according to the embodiment may be added with, in addition to the organic solvent, a polyoxyethylene derivative, which is a silicon-based surfactant, a fluorine-based surfactant, or a nonionic surfactant, from a viewpoint of decreasing surface tension and improving wettability with the recording medium.

As the silicon-based surfactant, polyester modified silicon or polyether modified silicon is preferably used. Specific examples thereof include BYK-347, 348, BYK-UV3500, 3510, 3530, and 3570 (all of the above are manufactured by BYK-Chemie Japan KK).

As the fluorine-based surfactant, a fluorine modified polymer is preferably used, and a specific example thereof includes BYK-340 (manufactured by BYK-Chemie Japan KK).

In addition, as the polyoxy ethylene derivative, an acetylene glycol-based surfactant is preferably used. Specific examples thereof include Surfynol 82, 104, 465, 485, TG (all of the above are manufactured by Air Products and Chemicals, Inc.), Olfine STG, E1010 (all of the above are manufactured by Nissin Chemical Industry Co., Ltd.), NISSAN-NONION A-10R, A-13R (all of the above are manufactured by NOF CORPORATION), FLOWLEN TG-740W, D-90 (manufactured by KYOEISHA CHEMICAL Co., LTD.), NOIGEN CX-100 (manufactured by DKS Co., Ltd.), or the like.

The content of the surfactant in the nonaqueous ink jet ink composition according to the embodiment is preferably 0.05 mass % to 3 mass %, and more preferably 0.5 mass % to 2 mass %.

1.4.4. Dispersant

In the nonaqueous ink jet ink composition according to the embodiment, an arbitrary dispersant used for the common ink composition may be used, from a viewpoint of improving dispersion stability of the pigment. Specific examples of the dispersant include a polyester-based polymer compound such as HINOACT KF1-M, T-6000, T-7000, T-8000, T-8350P, and T-8000E (all of the above are manufactured by Kawaken Fine Chemicals Co., Ltd.), Solsperse 20000, 24000, 32000, 32500, 33500, 34000, 35200, 37500 (all of the above are "Solsperse" manufactured by LUBRIZOL Corporation), Disperbyk-161, 162, 163, 164, 166, 180, 190, 191, 192 (all of the above are manufactured by BYK-Chemie Japan KK), FLOWLEN DOPA-17, 22, 33, G-700 (all of the above are manufactured by KYOEISHA CHEMICAL Co., LTD.), AJISPER PB821, PB711 (all of the above are manufactured by AJINOMOTO CO., INC.), LP4010, LP4050, LP4055, POLYMER400, 401, 402, 403, 450, 451, 453 (all of the above are manufactured by EFKA CHEMICALS B.V.), or the like.

In addition, as the dispersant, metal soap, a polymer dispersant having a basic group, or the like may be used, and the polymer dispersant having a basic group is preferable. In particular, a dispersant having an amino group, an imino group, or a pyrrolidone group as a basic group is preferable. As the polymer dispersant having a basic group, polyalkylene polyamine, salts of long chain polyaminoamides with high-molecular weight acid esters, salts of polyaminoamides with polar acid esters, modified polyurethane, polyester polyamine, or the like may be used.

Specific examples of the polymer dispersant having a basic group include "Anti-Terra-U (polyaminoamide phosphate)" of BYK-Chemie Japan KK, "Anti-Terra-204 (salts of high-molecular weight polycarboxylic acids)", and "Disperbyk-101 (polyaminoamide phosphate and acid ester) 130 (polyamide). In addition, Solsperse 5000 (phthalocyanine ammonium salt) of Avecia Co., 13940 (polyester polyimine), 17000, 18000, 19000 (polyester polyamine), and 11200 (polyester polyimine) can be exemplified. In addition, V-216 and V-220 (polyvinyl pyrrolidone having a long chain alkyl group) of International Specialty Products Inc. can be exemplified.

In the ink composition according to the embodiment, when the dispersant is used, a content thereof can be appropriately selected according to the pigment to be included, and the content thereof is preferably 5 parts by mass to 200 parts by mass, and more preferably 30 parts by mass to 120 parts by mass, with respect to 100 parts by mass of the pigment in the ink composition.

1.4.5. Others

The nonaqueous ink jet ink composition according to the embodiment may include, in addition to the components described above, substances for imparting predetermined performances such as a resin other than the vinyl chloride-based resin and the acrylic resin, a chelating agent such as ethylene diamine tetraacetate (EDTA), a preservative, a fungicide, a rust preventing agent, or the like.

As the resin other than the vinyl chloride-based resin and the acrylic resin, for example, aliphatic polyester, aromatic polyester, polyurethane, an epoxy resin, polyvinyl acetate, an ethylene-vinyl acetate copolymer resin, polycarbonate, polyvinyl butyral, polyvinyl alcohol, a phenoxy resin, an ethyl cellulose resin, a cellulose acetate propionate resin, cellulose acetate butyrate, a nitrocellulose resin, polystyrene, a vinyl toluene-α-methyl styrene copolymer resin, polyamide, polyimide, a polysulfonic resin, a petroleum resin, chlorinated polypropylene, polyolefin, a terpene resin, a rosin modified phenol resin, various synthetic rubbers such as NBR, SBR, and MBR, and modified products thereof may be used. These resins may be used singly, or two or more types thereof may be used in combination.

1.5. Use and Effect

The nonaqueous ink jet ink composition according to the embodiment is a solvent ink including the solvent of formula (1), and when the composition is recorded on a film medium such as the vinyl chloride-based recording medium, image quality is excellent. Thus, it is particularly preferable to use the composition for a sign exhibited in an outdoor environment. As the vinyl chloride-based recording medium, as long as the medium includes the vinyl chloride-based resin, it is not particularly limited. As the recording medium including the vinyl chloride-based resin, a hard vinyl chloride-based film, or a soft vinyl chloride-based film or a sheet can be exemplified. The nonaqueous ink jet ink composition according to the embodiment enables an image to be recorded on an untreated surface of the vinyl chloride-based resin base material, and does not demand use of an expensive recording medium, as the recording medium having a receptive layer in the related art which is an excellent effect. Further, it can be also applied to a base material having the surface treated with an ink receptive layer.

In addition, when the composition is applied to a sign exhibited in an outdoor environment, since the nonaqueous ink jet ink composition according to the embodiment includes PO-43, weather resistance of the image is particularly excellent.

In addition, since the composition is made as an ink set in which respective color inks such as cyan, magenta, yellow, and black, and a particular orange ink (the ink composition according to the embodiment) are combined, a color development having a wide gamut can be achieved, and the color development can be maintained for a long period of time.

Further, since the nonaqueous ink jet ink composition according to the embodiment includes a predetermined amount of Na, generation of the foreign matter caused by storage for a long period of time can be suppressed. Due to the above, nozzle clogging of the ink jet printer is prevented and discharge reliability can be increased.

2. Examples and Comparative Examples

In the following, the invention is further described by showing Examples and Comparative examples, but the invention is not limited at all by the following examples. The "parts" and "%" in the Examples and Comparative examples are based on mass unless otherwise stated.

2.1. Preparation of Ink Composition 2.1.1. Manufacture of Pigment 120 mL of ion exchanged water, 18 g of a hydrochloric acid, 6.8 g of an acetic acid, and 2 g of polyoxyalkylene alkyl amine were put into a 500 mL container, mixed, and stirred. Next, after 16 g of 2,5-dichloroaniline was put into the liquid, the liquid temperature was adjusted to about 5° C. by adding ice, and 6 g of sodium nitrite was put into the liquid and stirred for 30 minutes, while maintaining the liquid temperature within the container to 10° C. or lower, thereby obtaining a diazotized liquid.

Meanwhile, 200 mL of ion exchanged water and 23.5 g of 2-acetoacetyl amino-6-ethoxybenzothiazole were put into a 300 mL container, and stirred for 30 minutes. After that, 5.2 g of potassium hydroxide was added thereto and stirred for 30 minutes, thereby obtaining a reaction liquid.

The obtained diazotized liquid mentioned above was filtered by a filter paper (No. 5C), and the filtrate was put into a 2 L container. After 1 g of a sulphamic acid and g of sodium acetate were put into the filtrate, the liquid temperature was adjusted to 25° C. and pH was adjusted to 2.0 to 3.0. The reaction liquid mentioned above was put into the container and stirred for 60 minutes, while maintaining the liquid temperature to 25° C. Next, after the liquid was stirred for 30 minutes after the liquid temperature was increased to 90° C., 30% sodium hydroxide aqueous solution was put into the container to adjust pH to 8.5. After the finally obtained reaction liquid was filtered, and a residue was washed with ion exchanged water, the resultant was dried at a temperature of 80°. The dried residue was crushed by a sample mill, and a powdered pigment (a crude raw material) was obtained.

The crude raw material obtained as the above was heated at a temperature of 105° C. and dried. After 50 g of the crude raw material was put into 450 mL of N-methyl-2-pyrrolidone (NMP), it was heated to a temperature of 80° C. (the time for increasing the temperature is about 1 hour) while stirring, and stirred at a temperature of 80° C. for 2 hours. After that, it was cooled to a temperature of 30° C. or lower, and then filtered by Nutsche. The filtered residue was washed with 2 L of ion exchanged water, and the filtered residue was obtained as a paste-like pigment dispersion which includes a pigment and ion exchanged water. After that, the paste-like pigment dispersion was heated at a temperature of 105° C., dried, and crushed by a sample mill, and powdered PO-43 was obtained.

The PO-43 obtained by the preparation method mentioned above was adjusted by increasing the number of washings with ion exchanged water, so that PO-43 has a predetermined amount of metal ions. In addition, depending on the material used for synthesizing the pigment, the content of metal as included impurities is different. The number of washings of the various pigments synthesized as the above was further differentiated, and respective pigments (PO-43, PO-61, and PO-71) of Examples and Comparative examples having a different metal content were obtained.

In addition, measurement of the Na amount, the Ca amount, and the Fe amount was performed such that after an ink was acid-decomposed by a closed-type microwave wet decomposition equipment (ACTAC Project Services Corporation, a model speedwave 2), it was quantified by using an ICP emission spectrophotometric analyzer (manufactured by Shimadzu Corporation, a model "ICPS-8100"). In addition, measurement of the chlorine amount was performed such that after the pigment dispersion liquid described below was decomposed by combustion, it absorbed pure water, and it was quantified by using ion chromatography system (manufactured by Shimadzu Corporation, a model "PS3500DD"). The chlorine amount in the ink composition was calculated from the quantified amount of the pigment dispersion liquid and the added amount of the pigment dispersion liquid to the ink composition.

2.1.2. Preparation of Pigment Dispersion Liquid

The pigment obtained as described above and Solsperse 37500 (manufactured by LUBRIZOL Corporation) as the dispersant were used, the pigment was dispersed by changing the added amount of the dispersant in a range of 67 mass % to 200 mass % with respect to 100 parts by mass of the pigment, and a dispersion liquid was prepared. As the dispersion medium, a solvent which is included in the largest amount as the solvent in each ink combination example is used as the dispersion medium to prepare the pigment dispersion liquid.

2.1.3. Preparation of Ink Composition

Ink compositions having different pigment types and metal contents in material compositions shown in Tables 1 and 2 were prepared by using the pigment dispersion liquid prepared as described above. After the materials shown in Tables were put into the container, mixed, and stirred by a magnetic stirrer for 2 hours, the mixture was filtered by a membrane filter having a pore diameter of 5 μm to remove impurities such as waste, a coarse particle, or the like, thereby preparing each ink composition. In addition, the numerical values in the composition columns in Tables 1 and 2 are indicated by mass %.

2.2. Evaluation Experiment 2.2.1. Evaluation of Storage Stability

After measuring an initial viscosity of each ink, the ink was put into a closed container and placed in an environment of 60° C. for 1 week. After that, it was placed at room temperature (RT) for 1 day, and 10 cc of the ink was collected on a metal filter having a pore diameter of 10 μm. A content of the collected substance on the filter was confirmed using a microscope VHX-900 (manufactured by KEYENCE Corporation), and storage stability was determined based on the following standards.

<Determination Standard>

A: Foreign matter was not generated.

B: A small amount of foreign matter was generated.

C: A large amount of foreign matter was generated.

In addition, after the foreign matter was collected, viscosity of the placed ink was measured, a changing rate of the viscosity (%) was calculated by the following equation, and storage stability was determined based on the following standards.

<Determination Standard>

A: Changing rate of viscosity is less than 1%.

B: Changing rate of viscosity is equal to more than 1% to less than 2%.

C: Changing rate of viscosity is 2% or more.

2.2.2. Evaluation of Printing Quality (Coagulation Irregularity)

Each ink composition of the Examples and the Comparative examples was solid printed on a vinyl chloride banner sheet (manufactured by 3M Company, model number IJ51 (polyvinyl chloride)) at a concentration of 100% and a recording resolution of 720×720 dpi, using an ink jet printer (manufactured by SEIKO EPSON CORPORATION, model "SC-S70650"), and the sheet was dried in an environment of 25° C. and 65% RH (relative humidity) for 60 minutes. After that, coagulation printing irregularity of the printed surface was observed visually and using an optical microscope, and printing quality was determined based on the following standard.

<Determination Standard>

A: Coagulation irregularity was not observed.

B: Coagulation irregularity was slightly observed.

C: Coagulation irregularity was considerably observed.

2.2.3. Evaluation of Weather Resistance

Each ink composition of the Examples and the Comparative examples was solid printed on a vinyl chloride banner sheet (manufactured by 3M Company, model number IJ51 (polyvinyl chloride)) at a recording resolution of 720×720 dpi, using an ink jet printer (manufactured by SEIKO EPSON CORPORATION, model "SC-S70650"), and a recorded matter was obtained. The obtained recorded matter was put into a xenon weather meter (manufactured by Suga Test Instruments Co., Ltd.), and a cycle experiment was performed in order of "light irradiation 40 minutes"→"light irradiation+water rainfall 20 minutes"→"light irradiation 100% 60 minutes"→"water rainfall 60 minutes". The execution condition of the xenon weather meter was as follows. After this cycle experiment was performed continuously for 8 weeks, the recorded matter was taken out. An OD value of the taken out recorded matter was measured using a gretag densitometer (manufactured by GretagMacbeth LLC), a residual rate of the OD value (%) was obtained, and weather resistance was determined based on the following standard.

<Determination Standard>

A: Residual rate of the OD value was 90% or more.

B: Residual rate of the OD value was equal to or more than 80% and less than 90%.

C: Residual rate of the OD value was less than 80%.

<Execution Condition of Xenon Weather Meter>

Temperature and Humidity: 40° C. and 50% RH Light intensity: 300 nm to 400 nm, 60 W/m$^2$ 2.3. Evaluation Result Ink compositions according to Examples and Comparative examples and the evaluation results are shown in Tables 1 and 2.

TABLE 1

|  |  | Example 1 | Example 2 | Example 3 | Example 4 | Example 5 | Example 6 | Example 7 | Example 8 | Example 9 |
|---|---|---|---|---|---|---|---|---|---|---|
| Pigment type | PO-43 | 4 | 4 | 4 | 4 | 6 | 2 | 4 | 6 | 6 |
|  | PO-64 | — | — | — | — | — | — | — | — | — |
|  | PO-71 | — | — | — | — | — | — | — | — | — |
| Cyclic ester | γ-butyrolactone | — | 15 | 15 | — | — | — | — | — | — |
|  | σ-valerolactone | 20 | — | — | — | 20 | 20 | 20 | 20 | 20 |
| Solvent | DEGMEE | — | 40 | 24 | — | — | — | — | — | — |
|  | DEGdME | 30 | 34 | — | 40 | 30 | 30 | 30 | 30 | 30 |
|  | DEGDEE | — | — | 40 | — | — | — | — | — | — |
|  | DEGBME | 34 | — | — | — | 32 | 36 | 34 | 32 | 32 |
|  | TriEGdME | — | — | — | 29 | — | — | — | — | — |
|  | TetraEGdME | — | — | — | 10 | — | — | — | — | — |
|  | TetraEGmBE | — | — | 10 | — | — | — | — | — | — |
|  | Equamide M100 | 5 | — | — | — | 5 | 5 | 5 | 5 | 5 |
|  | AF-7 | — | — | — | 10 | — | — | — | — | — |
|  | Isooctyl palmitate | — | — | — | — | — | — | — | — | — |
| Dispersant | Solsperse 37500 | 4 | 4 | 4 | 4 | 4 | 4 | 4 | 4 | 4 |
| Surfactant | BYK340 | 1.5 | 1.5 | 1.5 | 1.5 | 1.5 | 1.5 | 1.5 | 1.5 | 1.5 |
| Fixing resin | SOLBIN CL | 1.5 | 1.5 | 1.5 | 1.5 | 1.5 | 1.5 | 1.5 | 1.5 | 1.5 |
| Metal and Ion content in ink | Na amount (ppm) | 198 | 198 | 198 | 198 | 460 | 98 | 12 | 123 | 89 |
|  | Ca amount (ppm) | 86 | 86 | 86 | 86 | 133 | 39 | 4 | 54 | 57 |
|  | Fe amount (ppm) | 124 | 124 | 124 | 124 | 171 | 87 | 95 | 98 | 89 |
|  | Cl- amount (ppm) | 495 | 495 | 495 | 495 | 735 | 295 | 95 | 420 | 90 |
|  | Total | 100.0 | 100.0 | 100.0 | 100.0 | 100.0 | 100.0 | 100.0 | 100.0 | 100.0 |
| Evaluation result | Storage stability — Foreign matter | A | A | A | A | B | A | B | A | B |
|  | Storage stability — Viscosity | A | A | A | B | A | A | A | A | A |
|  | Printing quality (coagulation irregularity) | A | B | A | B | B | A | A | B | B |
|  | Weather resistance | A | A | A | A | A | A | A | A | A |

TABLE 2

|  |  | Comparative Example 1 | Comparative Example 2 | Comparative Example 3 | Comparative Example 4 | Comparative Example 5 | Comparative Example 6 |
|---|---|---|---|---|---|---|---|
| Pigment type | PO-43 | 4 | — | — | — | — | 4 |
|  | PO-64 | — | 4 | 4 | — | — | — |
|  | PO-71 | — | — | — | 4 | 4 | — |
| Cyclic ester | γ-butyrolactone | — | — | — | 15 | — | — |
|  | σ-valerolactone | 15 | 20 | 20 | — | — | — |
| Solvent | DEGMEE | 24 | — | — | 24 | — | — |
|  | DEGdME | — | 30 | 30 | — | 40 | — |
|  | DEGDEE | 40 | — | — | 40 | — | — |
|  | DEGBME | — | 34 | 34 | — | — | — |
|  | TriEGdME | — | — | — | — | 29 | — |
|  | TetraEGdME | — | — | — | — | 10 | — |
|  | TetraEGmBE | 10 | — | — | 10 | — | — |
|  | Equamide M100 | — | 5 | 5 | — | — | — |
|  | AF-7 | — | — | — | — | 10 | 50 |
|  | Isooctyl palmitate | — | — | — | — | — | 39 |
| Dispersant | Solsperse 37500 | 4 | 4 | 4 | 4 | 4 | 4 |
| Surfactant | BYK340 | 1.5 | 1.5 | 1.5 | 1.5 | 1.5 | 1.5 |
| Fixing resin | SOLBIN CL | 1.5 | 1.5 | 1.5 | 1.5 | 1.5 | 1.5 |
| Metal and Ion content in ink | Na amount (ppm) | 584 | 195 | 602 | 420 | 564 | 198 |
|  | Ca amount (ppm) | 232 | 187 | 396 | 188 | 396 | 191 |
|  | Fe amount (ppm) | 116 | 141 | 185 | 131 | 136 | 106 |
|  | Cl- amount (ppm) | 820 | 470 | 800 | 410 | 810 | 690 |
|  | Total | 100.0 | 100.0 | 100.0 | 100.0 | 100.0 | 100.0 |
| Evaluation result | Storage stability — Foreign matter | C | B | C | A | B | B |
|  | Storage stability — Viscosity | A | A | A | A | B | B |
|  | Printing quality (coagulation irregularity) | A | A | B | A | B | C |
|  | Weather resistance | A | C | C | C | C | A |

In addition, abbreviations or trade names shown in Tables 1 and 2 are as follows.

<Pigment>
PO-43: C.I. pigment orange 43
PO-64: C.I. pigment orange 64
PO-71: C.I. pigment orange 71

<Cyclic Ester>
γ-butyrolactone: trade name, manufactured by Kanto Chemical Co., Inc.
σ-valerolactone: trade name, manufactured by Kishida Chemical Co., Ltd.

<Solvent>
DEGMEE: diethylene glycol methyl ethyl ether, trade name "Hisolve EDM", manufactured by TOHO Chemical Industry Co., Ltd., flash point 64° C.
DEGdME: diethylene glycol dimethyl ether, trade name "diethylene glycol dimethyl ether", manufactured by TOKYO Chemical Industry Co., Ltd., flash point 56° C.
DEGDEE: diethylene glycol diethyl ether, trade name "diethylene glycol diethyl ether", manufactured by TOKYO Chemical Industry Co., Ltd., flash point 71° C.
DEGBME: diethylene glycol butyl methyl ether, trade name "Hisolve BDM", manufactured by TOHO Chemical Industry Co., Ltd., flash point 94° C.
TriEGdME: triethylene glycol dimethyl ether, trade name "triethylene glycol dimethyl ether", manufactured by Kishida Chemical Co., Ltd., flash point 113° C.
TetraEGdME: tetraethylene glycol dimethyl ether, trade name "tetraethylene glycol dimethyl ether", manufactured by TOKYO Chemical Industry Co., Ltd., flash point 141° C.
TetraEGmBE: tetraethylene glycol monobutyl ether, trade name "Butycenol 40", manufactured by KH Neochem Co., Ltd., flash point 177° C.
Equamide M100: trade name, manufactured by Idemitsu Kosan Co., Ltd., amide-based solvent
AF-7: trade name, manufactured by JX Nippon Oil & Energy Corporation, naphthene-based hydrocarbon solvent
Isooctyl palmitate: trade name "IOP", manufactured by Nikko Chemicals Co., Ltd., fatty acid ester <Dispersant>
Solsperse 37500: trade name, manufactured by LUBRIZOL Corporation, polyester polyamide resin <Surfactant>
BYK340: trade name, manufactured by BYK-Chemie Japan KK, silicon-based surfactant <Fixing Resin>
SOLBIN CL: trade name, manufactured by Nissin Chemical Co., Ltd., vinyl chloride-vinyl acetate copolymer According to Examples 1 to 9, it is understood that an image having excellent weather resistance and printing quality can be formed using the nonaqueous ink jet ink composition of the invention. In addition, it is understood that the nonaqueous ink jet ink composition of the invention has an effect of suppressing generation of foreign matter, and has excellent storage stability.

The invention is not limited to the embodiment described above, and further the invention can be modified in various ways. For example, the invention includes the configuration described in the embodiment and the configuration substantially the same as the above embodiment (for example, the configuration having the same function, method, and effect, or the configuration having the same object and effect). In addition, the invention includes the configuration of which a nonessential part of the configuration described in the embodiment is substituted. In addition, the invention includes the configuration exhibiting the same effect as the configuration described in the embodiment, or the configuration which can achieve the same object as the configuration described in the embodiment. In addition, the invention includes the configuration in which the well-known technology is added to the configuration described in the embodiment.

The entire disclosure of Japanese Patent Application No. 2014-252818, filed Dec. 15, 2014 is expressly incorporated by reference herein.

What is claimed is:

1. A nonaqueous ink jet ink composition comprising:
a solvent including at least one compound represented by the following formula (1)

$$R^1O-(R^2O)_m-R^3 \quad (1),$$

wherein, in formula (1), $R^1$ and $R^3$ each independently represent hydrogen or an alkyl group having 1 to 5 carbon atoms, $R^2$ represents an alkylene group having 2 or 3 carbon atoms, and m represents an integer of 1 to 6; and
a pigment including a pigment orange 43 (PO-43);
wherein a Na amount included in the ink is 5 ppm to 500 ppm; and
a content of ionic chlorine is 50 ppm to 800 ppm with respect to a total amount of the ink composition.

2. The nonaqueous ink jet ink composition according to claim 1,
wherein a Ca amount included in the ink is 5 ppm to 200 ppm.

3. The nonaqueous ink jet ink composition according to claim 1,
wherein a content of the PO-43 is 1 mass % to 10 mass % with respect to a total amount of the ink composition.

4. The nonaqueous ink jet ink composition according to claim 1,
wherein a total content of the compound represented by the formula (1) is 10 mass % to 90 mass % with respect to a total amount of the ink composition.

5. The nonaqueous ink jet ink composition according to claim 1,
wherein cyclic ester is further included as the solvent.

6. The nonaqueous ink jet ink composition according to claim 1, further comprising:
a vinyl chloride resin.

7. The nonaqueous ink jet ink composition according to claim 1,
wherein the Na amount is 50 ppm to 500 ppm.

8. The nonaqueous ink jet ink composition according to claim 1,
wherein the Na is included as an electrolyte.

9. The nonaqueous ink jet ink composition according to claim 1, wherein, in formula (1), $R^1$ and $R^3$ each independently represent hydrogen or an alkyl group selected from the group of an n-propyl group, an iso-propyl group, an n-butyl group, a sec-butyl group, a tert-butyl group, an n-pentyl group, iso-pentyl, and a tert-penthyl group.

* * * * *